United States Patent [19]

Yamabe et al.

[11] Patent Number: 4,984,675
[45] Date of Patent: Jan. 15, 1991

[54] ARTICLE SORTING DEVICE

[75] Inventors: Keiji Yamabe; Masao Yoshinaga, both of Ohtemachi, Japan

[73] Assignee: Nihon Cement Co., Ltd., Japan

[21] Appl. No.: 413,469

[22] Filed: Sep. 27, 1989

[51] Int. Cl.$^5$ ............................................. B65G 47/46
[52] U.S. Cl. ...................................... 198/365; 198/440
[58] Field of Search ................................. 198/365, 440

[56] References Cited

U.S. PATENT DOCUMENTS

| | | | |
|---|---|---|---|
| 3,009,572 | 11/1961 | Seaborn | 198/365 |
| 3,093,245 | 6/1963 | Worchester et al. | 198/365 X |
| 3,190,432 | 6/1965 | Vanderhoff | 198/365 X |
| 3,735,867 | 5/1973 | Vanderhoof et al. | 198/365 X |
| 3,791,518 | 2/1974 | Vanderhoof | 198/440 X |
| 3,987,888 | 10/1976 | Wickam | 198/365 X |

FOREIGN PATENT DOCUMENTS

| | | | |
|---|---|---|---|
| 2912298 | 12/1979 | Fed. Rep. of Germany | 198/440 |
| 3538875 | 5/1986 | Fed. Rep. of Germany | 198/365 |
| 0151524 | 9/1982 | Japan | 198/365 |
| 0007130 | 1/1986 | Japan | 198/365 |

Primary Examiner—H. Grant Skaggs
Assistant Examiner—James R. Bidwell
Attorney, Agent, or Firm—McGlew & Tuttle

[57] ABSTRACT

A pair of sorting gates are fixed respectively to a pair of moving shafts that are disposed facing with each other so as to be able to move horizontally along the same straight line, and when a sorting gate is moved horizontally from a retracted position to a forwardly moved position interrupting the moving path of a sorting pin accompanying a forward motion of one of the moving shafts to which is fixed the sorting gate, the moving shaft at the forwardly moved position functions as a stopper member for the other moving shaft that is at the retracted position, and obstructs the forward motion of the moving shaft that is at the retracted position.

4 Claims, 6 Drawing Sheets

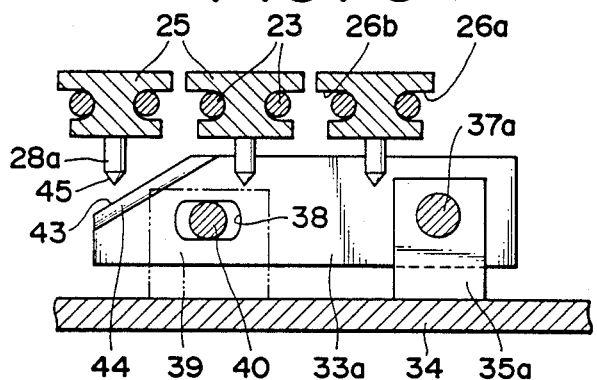
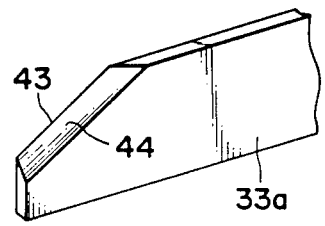
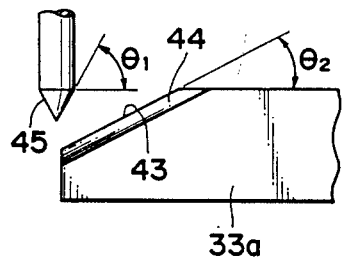
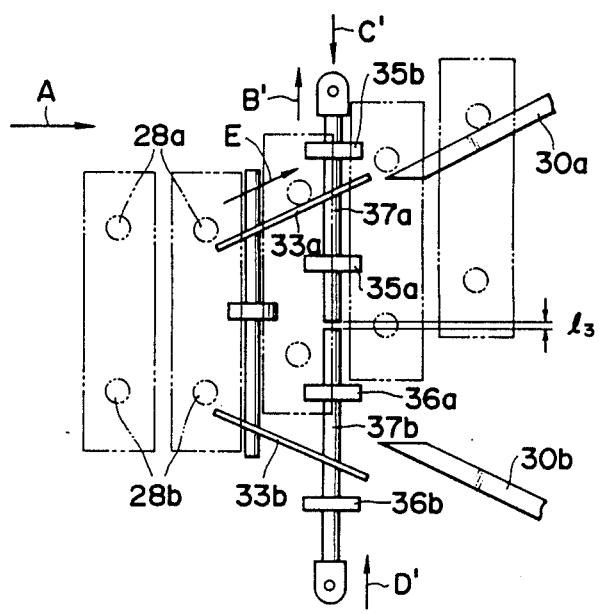

ARTICLE SORTING DEVICE

FIELD OF THE INVENTION AND RELATED ART STATEMENT

The present invention relates to an article sorting device which sorts out articles that are carried placed on article conveying boards in predetermined directions in accordance with their weight, size or the like.

FIG. 12 to FIG. 14 show an example of a sorting mechanism in a conventional article sorting device of the kind describe in the above. In the drawings, 1 is an article conveying board on which is placed an article to be carried, 2 is a sorting pin which extends downward from the bottom surface of the article conveying board 1, 3 is a guide rail for pushing the sorting pin 2 toward the center, 4 is a sorting gate whose turning is controlled by an output signal from an article discriminating device (not shown) which discriminates the kind of the article, 5 is a guide which guides the sorting pin 2 whose direction is changed up to a guide rail 6, and 7 is a base bed of these members.

A conventional article sorting device with a sorting mechanism as in the above is operated as in the following.

First, as the article conveying board 1 is moved in the direction of the arrow A in FIG. 12, the sorting pin 2 is guided toward the center by being engaged with the guide rail 3 to be led to the sorting gate 4. At this time, the kind of the article on the article conveying board 1 is discriminated based on its weight, size or the like by means of an article discriminating device which is not shown, and the turning of the sorting gate 4 is controlled in accordance with the result of the discrimination. That is, when a signal for moving straight ahead is output from the article discriminating device, the sorting gate 4 is directed in parallel with the direction of motion A of the article conveying board 1 as shown in FIG. 12, so that the article conveying board 1 is moved straight ahead without having its direction of motion changed by the guide 5. An article conveying board 1 which has an article of a kind different from that of the above placed on it is directed to the left, for example, with respect to the direction of motion A of the article conveying board 1 (see FIG. 13) based on an output signal from the article discriminating device, and the article conveying board 1 in question is caused to change its direction to the left. For an article conveying board 1 on which is placed still another kind of article, the sorting gate 4 is directed to the right, and accordingly, the article conveying board 1 in question is caused to change its direction of motion to the right.

As in the above, the article conveying board 1 is moved selectively in three directions of straight ahead, to the left and to the right in accordance with the turned position of the sorting gate 4. In this manner, articles placed on the respective article conveying boards are sorted out in three different kinds.

However, in the conventional article sorting device described as in the above, when the article conveying board 1 is moved at high speed in order to enhance the efficiency of the sorting work, there was a possibility of having a collision between the sorting pin 2 of the fast-moving article conveying board 1 and the front end 5a of the guide 5 when the sorting pin 2 passes by the front end 5a. Namely, when the shaft center of the sorting pin 2 and the front end 5a of the guide 5 are aligned in the midst of the turning of the sorting gate 4, there occurs a violent collision between them because the sorting pin 2 cannot afford to run off in any direction, creating a serious problem of giving damages to the device.

With the above situation in mind, there has been proposed a sorting mechanism as shown in FIG. 15 to FIG. 17 in place of the sorting mechanism described in the above in order to avoid a collision of the above kind. In the drawings, 1 is an article conveying board on which is placed an article to be carried, 2a and 2b are sorting pins that extend downward from the rear surface of the article conveying board 1, 6a and 6b are guide rails, 8 is one of parallel rods that are provided between a pair of endless chains, not shown, and are arranged to be fitted to the groove 1a on both sides of the article conveying board 1, 9a and 9b are sorting gates for leading the sorting pins 2a and 2b to a predetermined direction, and 9c and 9d are driving shafts for turning the sorting gates 9a and 9b.

A article sorting device with the above constitution is operated as described in the following.

First, when the article conveying board with a predetermined article placed on it is moved in the direction of the arrow A, the kind of the article is discriminated by an article discriminating device, not shown, based on the weight, size or the like of the article and the sorting gates 9a and 9b are turned in accordance with the result of the discrimination. Namely, when a signal for moving straight ahead is output from the article discriminating device, the front end of the sorting gates 9a and 9b are arranged in positions that are away from the moving paths of the sorting pins 2a and 2b, as shown by the solid line in FIG. 15 so that the article conveying board 1 and the article placed on it are moved straight ahead as shown in FIG. 16 without their directions of motion being changed. On the other hand, when a left signal is output from the article discriminating device, one of the sorting gates, namely, 9a alone is turned by the driving shaft 9c in the direction of the arrow P as indicated by the dotted line in FIG. 15, to be positioned within the moving paths of the sorting pin 2a. As a result, the sorting pin 2a engages with the sorting gate 9a as shown in FIG. 17 so that the article conveying board 1 is caused to change its direction of motion to the left with respect to the direction of motion A of the article conveying board 1, then is moved in a predetermined direction along the guide rail 6a. For an article conveying board 1 on which is placed still another kind of article, the sorting gate 9b alone is turned by the driving shaft 9d to be brought into the driving path of the sorting pin 2b, so that the article conveying board 1 in question is caused to change its direction of motion to the right, then is moved in a predetermined direction along the guide rail 6b.

In this way, the article conveying board 1 is moved selectively in three directions of straight ahead, to the left and to the right in accordance with the turned position of the sorting gate 9a or 9b. As a result, an article placed on each article conveying board 1 is sorted out into three kinds.

However, in the conventional article sorting device as in the above, the sorting gates 9a and 9b which lead the sorting pins 2a and 2b, and hence the article conveying board 1 itself, are composed of a pair of independently operated turning boards, so that there is a chance, by malfunction, of the pair of sorting gates 9a and 9b being turned simultaneously in the direction of the arrow P and entering within the respective moving paths of the sorting pins 2a and 2b. If such a situation happens, the sorting pins 2a and 2b collide simultaneously with the sorting gates 9a and 9b causing nonoperation of the device, with a possibility of causing damages to the device in some cases. Under these circumstances, when a pair of sorting gates 9a and 9b are adopted as in the above, it is necessary to employ a mechanism which can surely prevent a mulfunction.

Moreover, in the past, the sorting gates 9a and 9b are arranged to be driven with their rear ends as their respective centers of turning so that there is required a relatively large driving power. Furthermore, when an adequate means for accurately regulating the amount of turning of the sorting gates 9a and 9b is not adopted, there arose problems to cause such inconveniences as the stoppage of turning of the sorting gates 9a and 9b prior to their front ends' entering the moving paths of the sorting pins 2a and 2b, or an excessive turning of the sorting gates 9a and 9b which brings their front ends to be in contact with the article conveying board 1.

OBJECT AND SUMMARY OF THE INVENTION

The present invention was motivated in view of the above-mentioned circumstances, and it is, therefore, the object of the present invention to provide an article sorting device with an entirely novel constitution which has a simplified constitution, can prevent, needless to say, a simultaneous operation of the pair of sorting gates, operate the sorting gates with a small driving power, and yet can prevent such an inconvenience of bringing the sorting gates into contact with the article conveying board.

In order to achieve the above-mentioned object, in an article sorting device equipped with a pair of endless chains which are arranged facing with each other and are constructed so as to be driven to rotate in the same direction, a plurality of article conveying boards, with sorting pins fixed to the bottom surfaces of the respective boards, constructed so as to be coupled with the endless chains in a condition free to slide in a direction perpendicular to the driven direction of the pair of endless chains, and a pair of sorting gates which lead the ensuing sorting pins in a predetermined direction by entering within the moving paths of the sorting pins, the present invention is characterized in that the pair of sorting gates are fixed respectively to a pair of moving shafts that are arranged facing each other so as to be movable horizontally along the same straight line, whereby accompanying a forward motion of one of the moving shafts, the sorting gate fixed to that moving shaft is moved horizontally from its retracted position to a forwardly moved position to enter the moving path of the sorting pin, where the moving shaft at the forwardly moved position functions as a stopper member which restrains the forward motion of the other moving shaft that is in its restrained position.

BRIEF DESCRIPTION OF THE DRAWINGS

FIG. 1 to FIG. 10 are for explaining an embodiment of the present invention wherein:

FIG. 1 is an overall perspective diagram of the article sorting device;

FIG. 2 is a plan view in which the endless chains, the parallel rods and the article conveying boards are removed;

FIG. 3 is a disassembled perspective diagram showing the mounting condition of the article conveying board;

FIG. 4 is a sectional view taken along the line 50-50 in FIG. 3;

FIG. 5 is a plan view showing the sorting gates and the related mechanism;

FIG. 6 is a sectional view taken along the line 60-60 in FIG. 5;

FIG. 7 is a perspective view of the sorting gates;

FIG. 8 is a side elevation of the sorting pin and the sorting gate;

FIG. 9 and FIG. 10 are plan views showing the operation of the direction change of the article conveying boards;

FIG. 12 and FIG. 13 are plan views showing the article conveying mechanism;

FIG. 14 is an enlarged plan view showing the state of collision of the sorting pin with the front end of the guide;

FIG. 15 is a sectional diagram of another article sorting mechanism;

FIG. 16 is a plan view of the article sorting mechanism; and

FIG. 17 is a plan view showing the operation of the direction change of the article conveying boards.

DETAILED DESCRIPTION OF PREFERRED EMBODIMENTS

Referring to FIG. 1 to FIG. 10, an embodiment of the present invention will be described in detail in the following.

Figure 1:
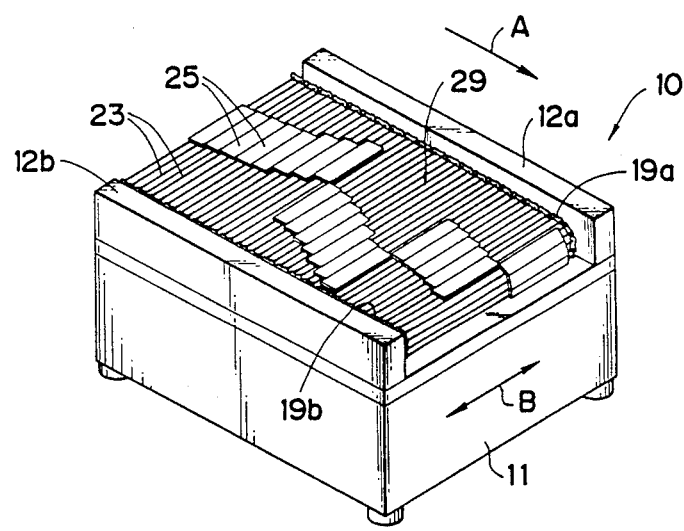
Figure 2:
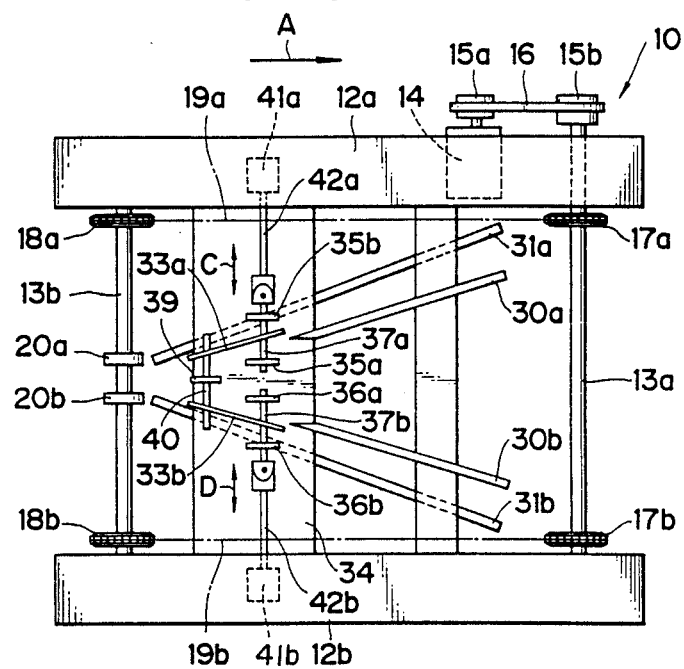

First, FIG. 1 and FIG. 2 are for showing the article sorting device of the present invention. In the drawings, 11 is a base bed, 12a and 12b are a pair of side boards mounted mutually in parallel on the base bed 11, and a pair of rotary shafts 13a and 13b are mounted rotatably between the side boards 12a and 12b. One of the rotary shafts, 13a, is arranged to be driven to rotate by a driving mechanism consisting of a motor 14, pulleys 15a and 15b and a belt 16. Further, on both ends of the rotary shafts 13a and 13b there are fixed sprockets 17a, 17b and 18a, 18b, respectively, and a pair of endless chains 19a and 19b are engaged with the sprockets 17a, 17b and 18a, 18b. As a result, the pair of endless chains 19a and 19b are arranged facing with each other, and are mutually driven to rotate at a constant speed along the arrow A in FIG. 1 and FIG. 2. Further, on the other rotary shaft 13b, a pair of disklike guides 20a and 20b as shown in FIG. 2.

Figure 3:
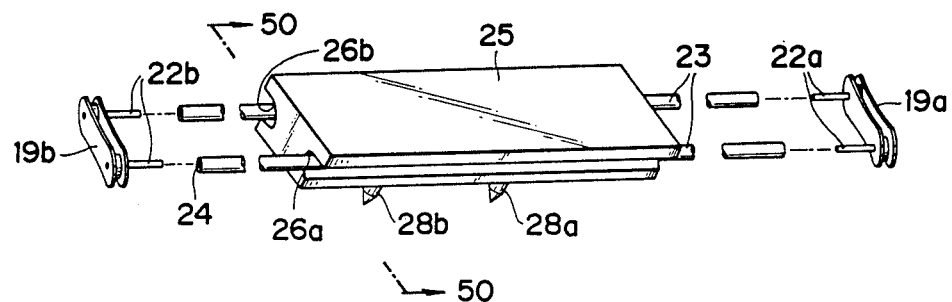
Figure 4:
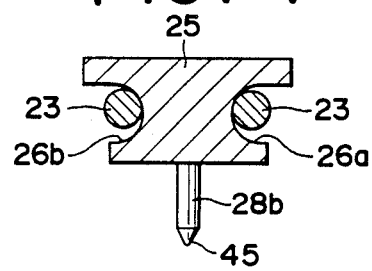

On the pair of endless chains 19a and 19b there are provided inwardly pointed mounting pins 22a and 22b at a predetermined pitch as shown in FIG. 3, and the mounting pins 22a and 22b are fitted to the holes 24 on both ends of the parallel rods 23. In this way, a multitude of parallel rods 23 are disposed between a pair of endless chains 19a and 19b, and an article conveying board 25 is arranged slidably between each pair of parallel rods 23. Namely, the article conveying board 25 is formed in a slender form, with substantially U-shaped side grooves 26a and 26b formed on its side faces extending in the lengthwise direction and the bar 23 fitted in parallel to each of the side grooves 26a and 26b.

The article conveying board 25 is constructed so as to be slidable in the direction of the arrow B (a direction perpendicular to the direction of motion A of the endless chains 19a and 19b) in FIG. 1 along the parallel rod 23 by means of the guiding action of the parallel rod 23.

Further, on the bottom surface of the article conveying board 25 there are fixed two sorting pins 28a and 28b perpendicular to the bottom surface, and a mechanism which guides each of the sorting pins 28a and 28b in a predetermined direction is provided inside an endless conveyor 29 which consists of the endless chains 19a and 19b, parallel rods 23 and article conveying boards 25. Namely, as shown in FIG. 2, in the inner upper part of the endless conveyor 29 there is disposed a pair of guide rails 30a and 30b that ar further separated as one moves toward the downstream side of the direction of motion A of the endless chains 19a and 19b. In the inner lower part of the endless conveyor 29 there are disposed recovery rails 31a and 31b.

Figure 5:
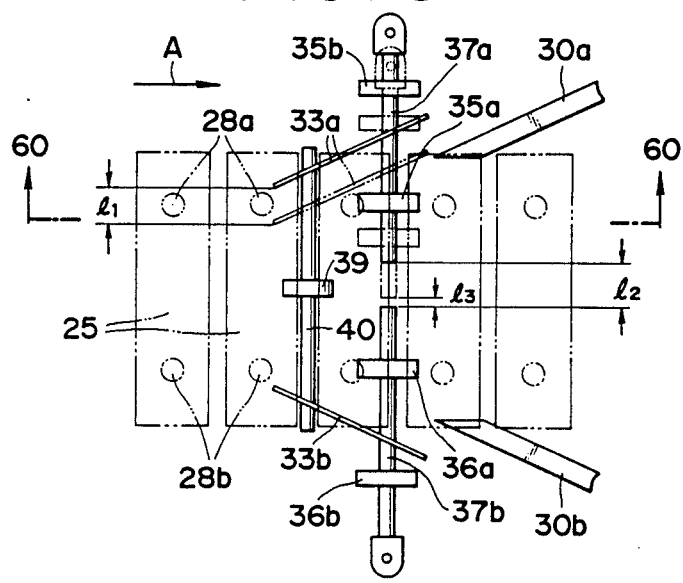

Moreover, as shown clearly in FIG. 2 and FIG. 5, there is arranged facing with each other a pair of sorting gates 33a and 33b consisting of a slender platelike member in the region between the guides 20a and 20b and the guide rails 30a and 30b, constructed so as to be free to move in directions C and D that are perpendicular to the direction of motion A of the sorting pins 28a and 28b. More specifically, there are erected two pairs of bearing plates 35a, 35b and 36a, 36b on a supporting plate 34 that bridges the side boards 12a and 12b, and moving shafts 37a and 37b are arranged penetrating through the bearing plates 35a, 35b and 36a, 36b so as to be free to move respectively in the horizontal direction. The sorting gates 33a and 33b are mounted integrally on the moving shafts 37a and 37b. The sorting gates 33a and 33b are disposed obliquely to intersect the direction of motion A of the sorting pins 28a and 28b that move over them, and have an increasingly large separation between them as one moves along the direction of motion A toward its downstream, similar to the case of the guide rails 30a and 30b described earlier. In a slot 38 formed at one end of each of the sorting gates 33a and 33b, there is inserted a pin member 40 disposed horizontally above the supporting plate 34, via a fixture 39 as shown in FIG. 6. On the other hand, the moving shafts 37a and 37b are arranged horizontally that their shaft centers are aligned, and are driven in the direction of the arrows C and D, respectively, by driving rods 42a and 42b of driving units 41a and 41b. In this case, the sorting gates 33a and 33b are moved horizontally in the directions of the arrows C and D guided by the engaging action between the pin member 40 and the slots 38 of the sorting gates 33a and 33b. However, the device is so constructed as to prevent the turning or rotation of the sorting gates 33a and 33b (i.e. such that they are maintained parallel to their original position). The sorting gates 33a and 33b are provided with the moving shafts formed integrally at their centers.

It should be noted that the device is constructed such that the relation between the horizontal distance $l_1$ of the forward motion of the moving shafts 37a and 37b, and hence also of the sorting gates 33a and 33b (distance from the retracted position shown by the solid line to the position shown by doubly dotted chain line in FIG. 5), and the distance between the opposing faces of the moving shafts 37a and 37b that are at the retracted positions shown by the solid line in FIG. 5, is given by $l_2 = l_1 + l_3$ (where, $l_3$ is a small distance).

Further, as shown clearly in FIG. 6 and FIG. 7, the upper corner at one end of the sorting gates 33a and 33b (the end on the downstream side of the direction of motion A of the article sorting board 1) is notched to form a slanted part 43 and a slanted face 44 that slopes down from the outside toward the inside is formed on the slanted part 43. On the other hand, the lower end of each of the sorting pins 28a and 28b is shaped in a conical form, and the angle of inclination $\theta_1$ of the conical part 45 and the angle of inclination $\theta_2$ of the slanted part 43 (see FIG. 8) are chosen to satisfy the relation $\theta_1 > \theta_2$.

Next, the operation of the article sorting device with the above constitution will be described.

First, when the rotary shaft 13a is driven to rotate by the motor 14, the endless chains 19a and 19b, and hence the endless conveyor 29, that are engaged with the sprockets 17a, 17b and 18a, 18b are rotated. When the article conveying board 25 is carried to the left end of the endless conveyor 29 with the revolution of the endless conveyor 29, the sorting pins 28a and 28b on the bottom surface of the article conveying board 25 are carried in the direction of the arrow A in FIG. 2 while being guided by the guides 20a and 20b. During this time, the kind of the article placed on the article conveying board 25 is discriminated by an article discriminating device, not shown, based, for example, on its weight.

When the weight of the article is discriminated to be normal, driving units 41a and 41b are actuated based on a predetermined output from the article discriminating device and the driving rods 42a and 42b are driven to be pulled in the direction to be further apart with each other as shown in FIG. 5. With this operation, the front ends of the sorting gates 33a and 33b are positioned to their retracted positions on the respective sides without entering the moving paths of the sorting pins 28a and 28b of the article conveying board 25 that moves in the direction of the arrow A. As a result, the pair of sorting pins 28a and 28b moves in the region between the sorting gates 33a, 33b and the guide rails 30a, 30b without ever being engaged with neither of them. Accordingly, the article conveying board 25 and the article placed on it are moved straight on along a first course without having their directions changed. At the right end (the part on the downstream side of the direction of motion A) of the endless conveyor 29 the article is transferred to a conveyor which is not shown to be transported further away.

When the article is lighter than the normal weight, one of the driving unit 41a is actuated with the driving rod 42a pushed to be moved in the direction of the forward motion. Because of this, one of the moving shafts, 37a, is slid in the direction of the arrow C' in FIG. 9 causing one of the sorting gates, 33a, to be arranged at a position to traverse the moving path of the sorting pin 28a. By the forward motion in the direction of the arrow C' of the sorting gate 33a, the sorting gate 33a alone interrupts the moving path of the sorting pin 28a so that the sorting pin 28a that is coming straight in the direction of the arrow A is engaged with the outside surface of the sorting gate 33a, and receives a component force in the direction of the arrow B' in FIG. 9. As a result, the sorting pin 28a is moved in the direction of the arrow E along the sorting gate 33a that is arranged at a predetermined angle with respect to the direction of motion A of the article conveying board 25, and moves along a second course guided by the guide rail 30a. The article whose direction is changed in the above manner is transferred to a separate conveyor at the right end of the endless conveyor 29 to be transported further.

Figure 10:
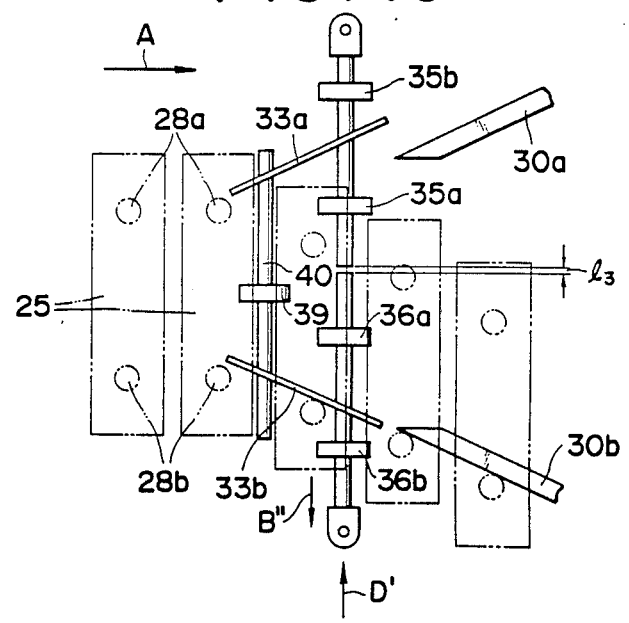

Moreover, when the article is formed to be heavier than the normal weight, the sorting gate 33b alone is turned in the direction of the arrow D' as shown in FIG. 10, the sorting pin 28b is engaged with the sorting gate 33b to be pushed in the direction of the arrow B" (the direction opposite to that of the arrow B'). Therefore, the article conveying board 25 is guided sequentially by the sorting gate 33b and the guide rail 30b to be moved along a third course. As described in the above, articles placed on the article conveying boards 25 can be sorted out in three kinds in accordance with the weight of the article.

Now, at the time of interruption of the sorting gate 33a or 33b, it is possible to have a collision, for instance, between the slanted part 43 of the sorting gate 33a and the lower end of the sorting pin 28a. In the present embodiment, the lower part of the sorting pin is shaped in a conical form 45 so that the probability of collision is very small. Further, even when a collision occurs between them, the sorting pin 28a runs on the edgelike slanted part 43 of the sorting gate 33a while absorbing the clearance between the side grooves 26a, 26b and the parallel bars 23. However, the sorting pin 28a is moving in a direction intersecting the sorting gate 33a so that the running-on condition will be released immediately after collision, and the sorting pin 28a slides down along the slanted face 44 of the sorting gate 33a, entering smoothly in the moving path of the sorting pin 28a. Accordingly, there will be no fear of giving damages to the device.

Moreover, when one of the sorting gates is in its forwardly moved position, if the other sorting gate which was in the retracted position is moved by malfunction of the device in the direction of its forward motion, then both of the sorting pins 28a and 28b engage simultaneously with the sorting gates 33a and 33b, respectively, creating a possibility of giving damages to the device. However, in the present embodiment, the sorting gates 33a and 33b are arranged to be moved horizontally together with the moving shafts 37a and 37b as mentioned earlier, so that the simultaneous operation (that is, a mulfunction) of the sorting gates 33a and 33b can be prevented positively. Namely, under the condition where one of the moving shafts, for example, 37a, of the pair of moving shafts 37a and 37b that are in the respective retracted positions shown in FIG. 5, is moved forwardly or rearwardly in the direction of the arrow C' as shown in FIG. 9, the distance over which the moving shaft 37b in its retracted position can be moved in the inward direction indicated by the arrow D' is just a small distance l₃ since the moving shaft 37a is positioned in the vicinity of the other moving shaft 37b. Consequently, one of the moving shaft, 37a, functions as a stopper member for the other moving shaft 37b so that the inward motion of the moving shaft 37b in its retracted position can surely be obstructed. In a similar manner, when the moving shaft 37b moves inwardly as shown in FIG. 10, the inward motion of the other moving shaft 37a is obstructed positively by the moving shaft 37b. As a result, when either one of the moving shafts 37a and 37b is in the inwardly moved position, the other moving shaft 37a or 37b is held at a position in front of that traversing the moving path of the sorting pin 28a or 28b. Therefore, such a situation in which damages are given to the device by the simultaneous engagement of the sorting gates 33a and 33b with the sorting pins 28a and 28b can surely be avoided.

In the foregoing, an embodiment of the present invention has been described, but the present invention is not limited to the above embodiment alone, and various modifications and changes are possible based on the technical ideas of the present invention.

Figure 11:
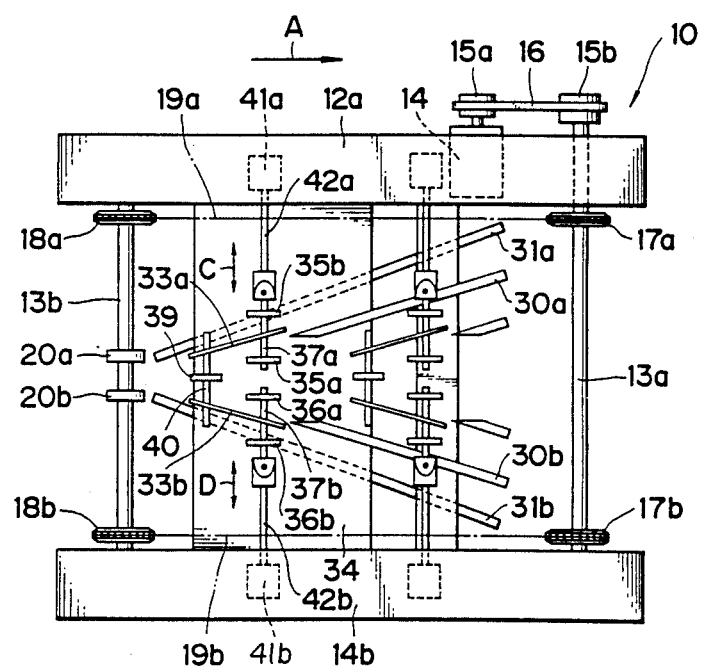
FIG. 11 is a plan view similar to FIG. 2 showing a modification of the present invention.
Figure 12:
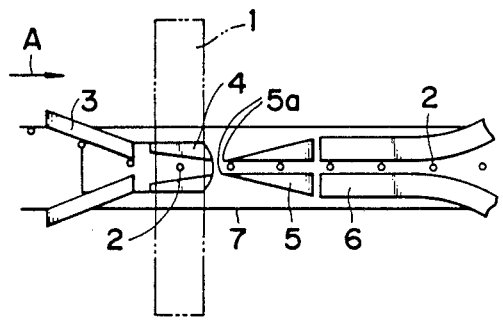
FIG. 12 to FIG. 17 are for explaining the conventional article sorting device.
Figure 13:
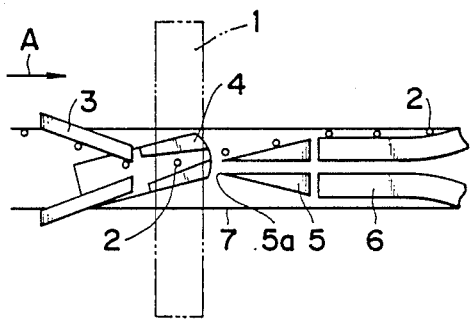
Figure 14:
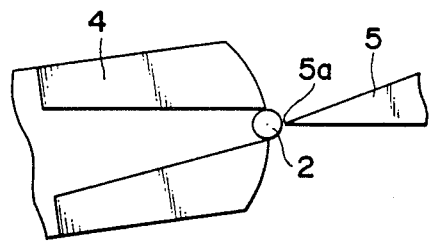
Figure 15:
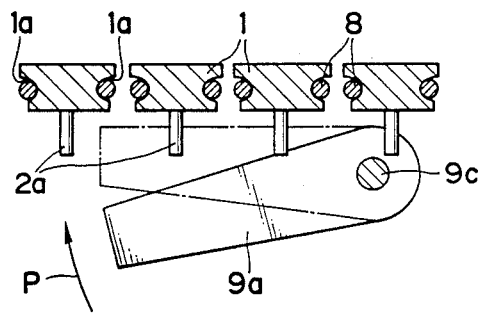
Figure 16:
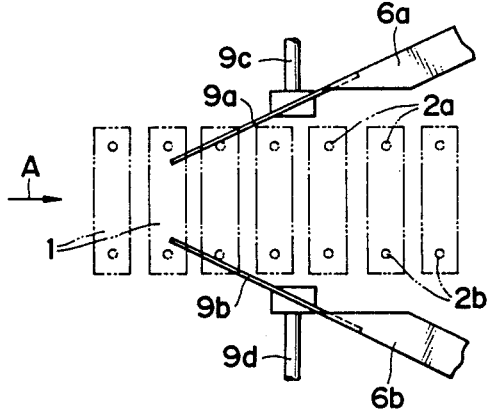
Figure 17:
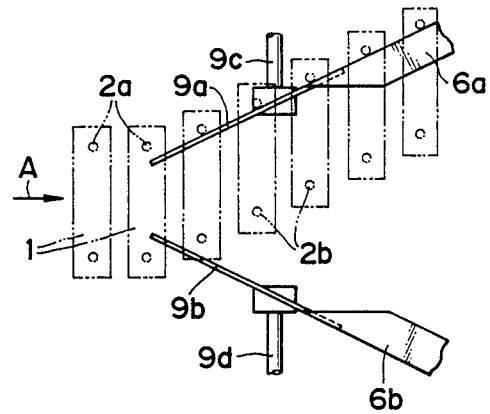

For instance, in the above embodiment, sorting of articles into three kinds was realized by using one set of sorting mechanism consisting of a pair of moving shafts 37a and 37b, sorting gates 33a and 33b and guide rails 30a and 30b. However, by providing two sets of the sorting mechanisms as shown in FIG. 11, it becomes possible to realize an article sorting into five kinds. By further increasing the sorting mechanism to three or more sets, it becomes possible to obtain article sorting into more kinds than in the above. Further, needless to say, the present invention can also be applied to the system having one sorting pin for each article conveying board 25.

As in the above, a pair of sorting gates are fixed respectively to a pair of moving shafts that can be moved horizontally along the same straight line so that when one of the sorting gates enters the moving path of the sorting pin accompanying the forward motion of one of the moving shafts, the moving shaft in the forwardly moved position is constructed so as to function as a stopper member which obstructs the forward motion of the other moving shaft. Therefore, there is no fear of creating a situation in which a pair of sorting gates are forwardly moved simultaneously to be engaged with the sorting pins. Therefore, it is possible to prevent damages to the device. Moreover, the sorting gates are arranged to be moved horizontally with respect to the article conveying boards so that it is possible to change the direction of the article conveying boards with a relatively small force. Further the interval between the article conveying boards and the sorting gates is kept constant for all the time even during the operation of the sorting gates, so that such an inconvenience as an unexpected contact between them can be avoided. Moreover, the article sorting device in accordance with the present invention has an advantage in that in spite of its being able to accomplish these operational effects, one is only required to adopt a simple construction in which the sorting gates are moved horizontally together with the moving shafts.

We claim:

1. An article sorting device comprising: a pair of endless chains disposed facing each other and constructed so as to be driven to rotate and move in a first direction; a plurality of article conveying boards; sorting pins fixed to a bottom surface of each of said plurality of article conveying boards each of said plurality of article conveying boards being interlocked with said endless chains under a condition free to slide in a direction perpendicular to said first direction; a pair of sorting gates, for leading the ensuing sorting pins in a predetermined direction by interrupting a moving path of the sorting pins, said pair of sorting gates being fixed respectively to a pair of moving shafts arranged facing each other, said pair of moving shafts being positioned to each be movable horizontally inwardly and horizontally outwardly along the same straight line between an inwardly moved position and a retracted position, upon horizontal inward motion of one of said moving shafts, the sorting gate, fixed to the moving shaft, is moved horizontally from a retracted position to an inwardly moved position, interrupting the moving path of said sorting pin, each of said moving shafts at the inwardly moved position functioning as a stopper member to obstruct the inward motion of the other said pair of moving shafts that is at the retracted position.

2. An article sorting device as claimed in claim 1, wherein the device is constructed such that the distance between one of said moving shafts at said inwardly moved position and the other of said moving shaft at said retracted position is set to be minute at the time of operation of the device, thus the available movable distance of the inward motion of said moving shaft at the retracted position is made small.

3. An article according to claim 2, wherein said stopper member is formed at an end of each of said pair of moving shafts, the distance between said ends when one of said pair of moving shafts is in a retracted position and the other of said pair of moving shafts is in the inwardly moved position (13) is a small distance and the distance between the ends of said pair of moving shafts when each of said pair of moving shafts is in the retracted position (12) is equal to the small distance (13) plus the distance of inward movement of one of said shafts (11).

4. An article according to claim 1, further comprising a pair of guide rails provided following said pair of sorting gates with respect to said first direction, said guide rails for guiding said sorting pins.

* * * * *